US008959239B2

(12) United States Patent
Pettersson (10) Patent No.: US 8,959,239 B2
(45) Date of Patent: Feb. 17, 2015

(54) METHOD AND APPARATUS FOR REPORTING STREAMING MEDIA QUALITY (75) Inventor: Mattias Pettersson, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1416 days.

(21) Appl. No.: 11/764,476

(22) Filed: Jun. 18, 2007

(65) Prior Publication Data

US 2008/0162714 A1    Jul. 3, 2008

Related U.S. Application Data (60) Provisional application No. 60/882,711, filed on Dec. 29, 2006.

(51) Int. Cl.
G06F 15/16    (2006.01)
H04L 29/06    (2006.01)

(52) U.S. Cl.
CPC ......... H04L 65/80 (2013.01); H04L 29/06027 (2013.01); H04L 65/4092 (2013.01); H04L 65/608 (2013.01)
USPC .......... 709/231; 709/227; 709/228; 709/229; 709/230; 709/232

(58) Field of Classification Search
CPC ................. H04L 29/06326; H04L 29/06523; H04L 29/06469; H04L 65/4092; H04L 65/80
USPC ................................................ 709/227–232
See application file for complete search history.

(56) References Cited

U.S. PATENT DOCUMENTS 6,621,793 B2 *  9/2003  Widegren et al. .......... 370/230.1
6,763,392 B1    7/2004  del Val et al.
(Continued)

FOREIGN PATENT DOCUMENTS

WO        2004/071105        8/2004
WO    WO 2005022865 A1 *    3/2005
(Continued)

OTHER PUBLICATIONS

M. Frederic Gabin, NEC Technologies, "Draft Rel-6 PSS Quality Metrics Permanent Document", 3GPP TSG-SA4, Meeting 29, No. Tdoc S4-030860, Nov. 24-28, 2003, p. 1-19.*
(Continued)

Primary Examiner — Thu Nguyen
Assistant Examiner — Angela Widhalm
(74) Attorney, Agent, or Firm — Coats & Bennett, PLLC (57) ABSTRACT A streaming media client negotiates a single value for each reporting parameter associated with all accepted quality metrics applied to the same level of a streaming media session. This way, each quality metric applied to the same level of a streaming media session is reported with the same rate and optionally the same range, thus reducing the number of QoE/QoS reports generated by the client. According to one embodiment, quality of a streaming media session established between a client and a server is indicated by negotiating a single value for a reporting parameter associated with a plurality of quality metrics applied to the same level of the streaming media session. The level may be the session level or a media level. The quality metrics accepted by the client and server during negotiation are reported according to the negotiated reporting parameter value.

24 Claims, 5 Drawing Sheets

(56) References Cited

U.S. PATENT DOCUMENTS

| | | | |
|---|---|---|---|
| 7,054,945 B2* | 5/2006 | Hurtta et al. | 709/230 |
| 7,583,612 B2* | 9/2009 | Lin | 370/252 |
| 7,599,307 B2* | 10/2009 | Seckin et al. | 370/252 |
| 7,602,723 B2* | 10/2009 | Mandato et al. | 370/236 |
| 7,609,673 B2* | 10/2009 | Bergenlid et al. | 370/329 |
| 7,738,390 B2* | 6/2010 | Rey et al. | 370/252 |
| 8,452,884 B2* | 5/2013 | Wang | 709/231 |
| 2003/0115332 A1* | 6/2003 | Honeisen | 709/227 |
| 2004/0196849 A1* | 10/2004 | Aksu et al. | 370/395.2 |
| 2004/0218607 A1* | 11/2004 | Hurtta et al. | 370/395.21 |
| 2005/0089043 A1* | 4/2005 | Seckin et al. | 370/395.21 |
| 2005/0157660 A1 | 7/2005 | Mandato et al. | |
| 2005/0201296 A1 | 9/2005 | Vannithamby et al. | |
| 2005/0204052 A1* | 9/2005 | Wang et al. | 709/231 |
| 2005/0259947 A1 | 11/2005 | Wang et al. | |
| 2006/0008020 A1 | 1/2006 | Blankenship et al. | |
| 2006/0206617 A1 | 9/2006 | Rey et al. | |
| 2007/0008943 A1 | 1/2007 | Grant et al. | |
| 2008/0049648 A1* | 2/2008 | Liu et al. | 370/310 |
| 2008/0192646 A1* | 8/2008 | Song et al. | 370/252 |

FOREIGN PATENT DOCUMENTS

| | | |
|---|---|---|
| WO | 2005/032185 | 4/2005 |
| WO | 2005/088929 | 9/2005 |

OTHER PUBLICATIONS

Frojdh, Per et al. "Adaptive Streaming within the 3GPP Packet-Switched Streaming Service." IEEE Network, 2006, vol. 20, No. 2, pp. 34-40, ISSN: 0890-8044.

Soldani, David. "Means and Methods for Collecting and Analyzing QoE Measurements in Wireless Networks." International Workshop on Wireless Mobile Multimedia Archive. Proceedings of the 2006 International Symposium on World of Wireless, Mobile and Multimedia Networks, 2006, pp. 531-535, ISBN: 0-7695-2593-8.

3GPP TS 26.234. 3rd Generation Partnership Project; Technical Specification Group Services and System Aspects; Transparent end-to-end Packet-switched Streaming Service (PSS); Protocols and codecs (Release 6). V6.6.0 (Dec. 2005). Relevant pp. 31-33, 38, 52-58.

Schulzrinne, H. et al. "Real Time Streaming Protocol (RTSP)." The Internet Society, Network Working Group, Apr. 1998. Available at http://www.ietf.org/rfc/rct2326.txt.

* cited by examiner

```
SETUP rtsp://server.com/content/baz.3gp  RTSP/1.0
Cseq: 2
3GPP-QoE-metrics:
url="rtsp://server.com/content/baz.3gp/audiotrack";
metrics={Corruption_Duration}; rate=20
url="rtsp://server.com/content/baz.3gp/videotrack";
metrics={Corruption_Duration}; rate=10; Range: npt=0-40
url="rtsp://server.com/content/baz.3gp/videotrack";
metrics={Framerate_Deviation}; rate=20; Range: npt=0-40
url="rtsp://server.com/content/baz.3gp;
metrics={Initial_Buffering_Duration}; rate=End
```

```
3GPP-QoE-metrics:
url="rtsp://server.com/content/baz.3gp/videotrack";
metrics={Corruption_Duration | Framerate_Deviation}; rate=20; Range: npt=0-40
url="rtsp://server.com/content/baz.3gp/audiotrack";
metrics={Corruption_Duration}; rate=20
```

```
SET_PARAMETER rtsp://server.com/content/baz.3gp  RTSP/1.0
Cseq: 302
Session: 17903320
3GPP-QoE-Feedback:
url="rtsp://server.com/content/baz.3gp/audiotrack";
Corruption_Duration={200 1300}
Content-length: 0
```

METHOD AND APPARATUS FOR REPORTING STREAMING MEDIA QUALITY

CROSS REFERENCE TO RELATED APPLICATIONS

This application claims the benefit of U.S. Provisional Application No. 60/882,711, filed Dec. 29, 2006, which is incorporated herein by reference in its entirety.

BACKGROUND

The present invention generally relates to streaming media content, and particularly relates to reporting the quality of streaming media content.

Streaming media is multimedia content that is continuously received by, and normally displayed to, a client while it is being delivered by a content server. "Streaming" refers to the ability of an application to play synchronized media streams like audio and video streams in a continuous way while the streams are being transmitted to the client over a network. Streaming media is available over fixed IP networks such as the Internet and more recently over radio access networks via 3GPP's Packet-switched Streaming Services (PSS) protocol TS 26.234.

The Internet Engineering Task Force (IETF) maintains the Real-time Streaming Protocol (RTSP) standard RFC 2326, the Real-time Transport Protocol (RTP) standard RFC 1889 and the Real-time Transport Control Protocol (RTCP) standard RFC 4585. These standards enable streaming media services. RTSP allows a client to remotely control a streaming media server, e.g., by issuing VCR-like commands such as "play" and "pause." A streaming media session is initiated when a client issues an RTSP 'DESCRIBE' command including a Uniform Resource Identifier (URI) identifying a streaming media server (rtsp:// . . . ). The DESCRIBE request also identifies the type of reply data that can be handled by the client. The response sent by the streaming media server includes a presentation description, typically in Session Description Protocol (SDP) format.

Presently, SDP information may be obtained via an RTSP DESCRIBE request or by fetching an SDP file via HTTP, e.g. in Wireless Access Protocol (WAP) applications. When obtained via HTTP, the client already starts with a downloaded SDP file. Either way, the SDP presentation description declares the media types to be used in the session using a codec-specific MIME media type for each media component. Each media type is associated with a URI identifying the location of the corresponding media content.

The client sends an RTSP 'SETUP' request to the content server in response to the DESCRIBE request. The SETUP request specifies how each media stream is to be transported. The request contains the media stream URIs and a transport specifier. The transport specifier typically includes a local port for receiving RTP data (e.g., audio, video or text), and another for RTCP data (meta information). The server reply confirms the chosen parameters and fills in missing parts, such as the server's chosen ports. Each media stream is configured using an RTSP SETUP message before a play request may be sent from the client to the server.

After each media stream is configured, the client sends a 'PLAY' request to the server which causes one or more media streams to be played. The URI specified in the PLAY request may be an aggregate URI (to play all media streams), or a single media stream URI (to play only that stream). One or more of the media streams may be halted by the client issuing a 'PAUSE' request. The client sends a 'TEARDOWN' request to the client for terminating the streaming media session. The TEARDOWN request stops all media streams and frees all session related data on the server.

Streaming media servers conventionally request clients to send Quality of Service (QoS) or Quality of Experience (QoE) reports, for indicating quality of streaming media content received by the clients. A QoS/QoE quality report indicates the quality of a particular streaming media session and includes data measured by a client at the transport layer, application layer or both for the metric being reported. While the server requests the client to generate the quality reports, it is the client that determines which quality metrics are reported to the server and when. Presently, six QoS/QoE metrics are defined while others are proposed. Two quality metrics may be applied to the session level—the initial buffering duration and re-buffering duration metrics. The successive loss of RTP packets, corruption duration, frame rate deviation, and jitter duration metrics are applied to the media levels, e.g., audio, video, speech or timed text level. A new QoE metric under consideration by the 3GPP TSG-SA Working Group reports the time that elapses between the initiation of a content switch by a user and up to the time of reception of the first media packet from the new content or media stream (3GPP 26.234 Change Request 0112).

The client also specifies one or more reporting parameters for each quality metric supported by the client. Minimally, a reporting rate parameter is agreed to for each supported metric. The reporting rate parameter expresses the maximum time period in seconds between two successive QoS/QoE reports for the corresponding metric. Optionally, a reporting range parameter may also be specified. The reporting range parameter defines the time range in a media stream for which quality metrics are reported, e.g., the first 40 seconds of media play time. A new reporting parameter related to context switching is under consideration by the 3GPP TSG-SA Working Group (3GPP 26.234 Change Request 0112). The new context switch reporting parameter under consideration measures the duration of a content switch. The client and server negotiate the quality metrics and reporting parameters to be reported by the client. For example, the server may propose an initial set of metrics as part of the SDP description provided to the client in response to an RTSP DESCRIBE request. In another example, the server first makes the proposition at a later stage, e.g., as part of the SETUP response.

However, the client ultimately determines which metrics it will report and according to what parameters. The client is free to negotiate the metrics and reporting parameters with the server, e.g., by including metric proposals in an RTSP SETUP or PLAY request or SET_PARAMETER or OPTIONS method. The metric negotiation process continues until the client receives a PLAY response from the content server. Alternatively, negotiation may be restricted to a number of round trips. Either way, the client reports the metrics and parameters accepted by both the client and server after the metric negotiation process ceases. A metric and parameter are considered accepted by both the client and server when acknowledged accepted by the server, i.e., the server echoes the client's proposal, e.g., as part of an RTSP SETUP or PLAY response. Once a metric is acknowledged accepted by the server, the client no longer includes the same metric in subsequent requests to the server. For example, the client may propose a reporting rate of 10 seconds for corruption duration and 20 seconds for frame rate deviation as applied to a video media stream. The server may acknowledge the reporting rate of 10 seconds for corruption duration but may counter-propose a reporting rate of 15 seconds for frame rate deviation. The client does not include the corruption duration metric in subsequent negotiations involving the video media stream since it has been acknowledged accepted by the server. However, the client may propose a different reporting rate for frame rate deviation or accept the rate proposed by the server. Since the frame rate deviation metric is not yet agreed upon, the client sends a new request to the server with the same proposal (e.g. rate=15) or a new proposal (e.g. rate=10) or instead rejects the metric. The server then acknowledges the proposal in the response. The metric and reporting parameter are agreed upon only when acknowledged accepted by the content server.

Client performance decreases as the number of quality metrics negotiated by the client increases. Under a worst-case scenario, a client may attempt to negotiate two different quality metrics for the session level of a streaming media session and four different quality metrics for up to four different media levels of the session. Client performance is further decreased if the client attempts to negotiate a different reporting parameter for each proposed quality metric. Such extensive metric negotiations degrade client performance, which is particularly a concern for resource-constrained devices such as mobile phones. Further, the bandwidth consumed negotiating a large number of quality metrics and different reporting parameter values can be quite high.

Excessive bandwidth consumption is an even bigger concern when the client subsequently reports the agreed upon quality metrics according to the different reporting rates/ranges. For example, approximately 200 bytes are required to generate a QoE/QoS report and another 80 bytes are needed for the corresponding server response message. Excessive bandwidth is consumed if each supported quality metric is reported individually, e.g., because each supported quality metric has a different reporting rate and/or range. Upwards of 5% or more of a 70 kbps link may be consumed reporting individual quality metrics at different reporting intervals. The high bandwidth needed for QoE/QoS reporting reduces the bandwidth available for transmitting actual data, which is a major concern particularly for bandwidth-constrained devices such as mobile phones. Further, the implementation of the reporting phase is more complex when multiple reporting parameter values are selected because quality metrics are reported at disparate reporting rates and ranges.

SUMMARY

According to the methods and apparatus taught herein, a streaming media client negotiates a single value for each reporting parameter associated with all quality metrics applied to the same level of a streaming media session or even across multiple levels. For example, the client may negotiate a single reporting rate for all accepted quality metrics applied to the session level of the streaming media session. The client may also negotiate a single reporting rate for all accepted quality metrics applied to each media level of the streaming media session. This way, each quality metric applied to the same level or multiple levels of a streaming media session is reported with the same rate and optionally the same range, thus reducing the number of QoE/QoS reports generated by the client.

Accordingly, bandwidth consumption is reduced and client performance improved. Further, the implementation of the reporting phase becomes simpler when a single reporting parameter value is selected because fewer parameters are dealt with. While the negotiation phase becomes more complex, negotiation is only performed once per session, while reporting is done continuously. In addition, the reporting is done while the mobile phone platform is performing decoding and rendering of the media, which most likely is optimized for performance. Of course, as standards advance over time, the client may negotiate a single value for other types of reporting parameters such as a parameter associated with content switching or other aspects of PSS.

According to one embodiment, quality of a streaming media session established between a client and a server is indicated by negotiating a single value for a reporting parameter associated with a plurality of quality metrics applied to the same level of the streaming media session. The level may be the session level or a media level. The quality metrics accepted by the client and server during negotiation are reported according to the negotiated reporting parameter value.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
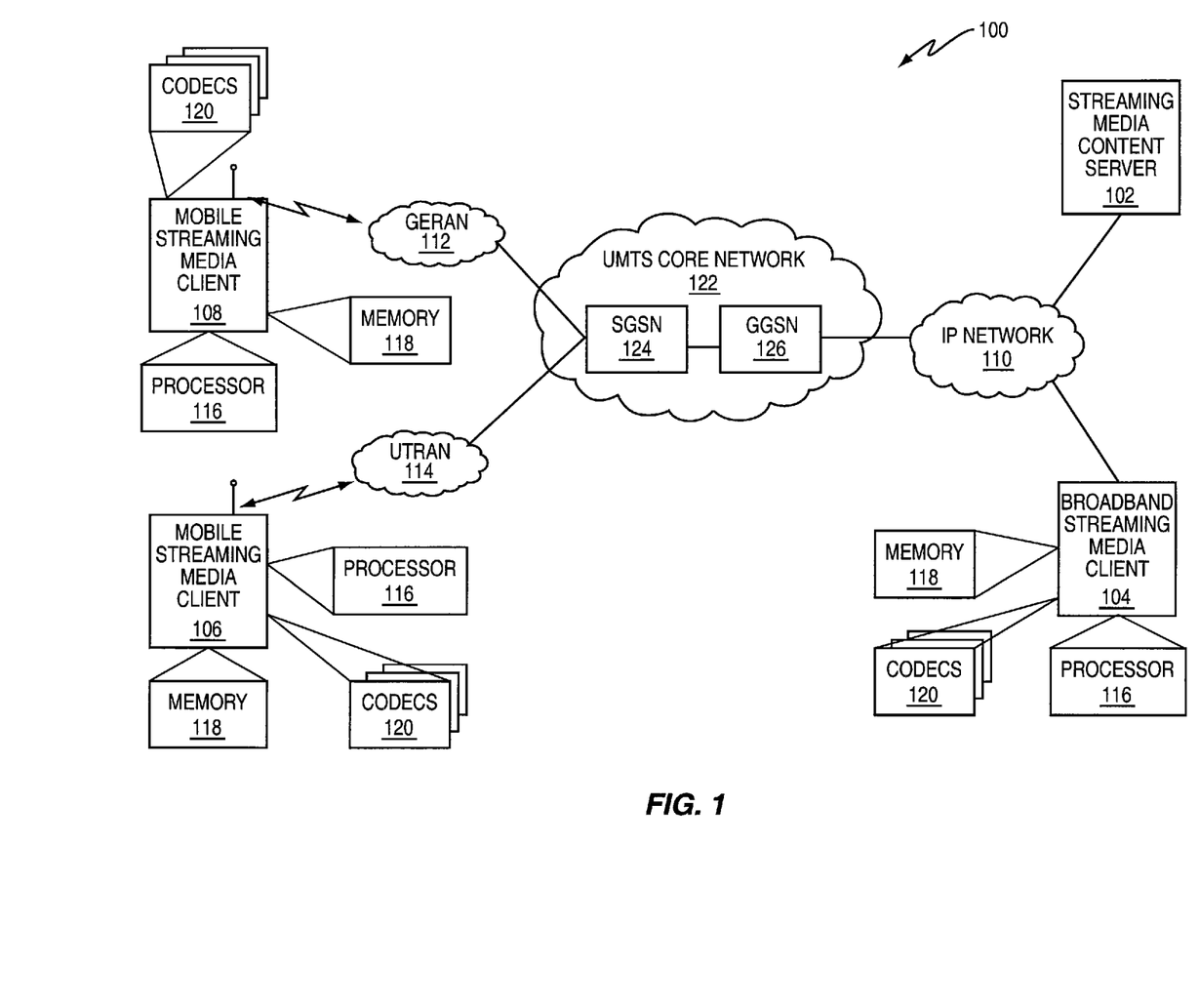
FIG. 1 is a block diagram of an embodiment of a network including a streaming media content server and streaming media clients.

FIG. 1 illustrates an embodiment of a network environment 100 including a streaming media content server 102 and a plurality of streaming media clients 104, 106, 108. The content server 102 provides streaming media such as video, audio, speech and timed text to the clients 104, 106, 108 upon request. Some of the clients may be a 'fixed' or broadband client 104 coupled to the media server 102 via an IP network 110 such as the Internet. Other clients are mobile phones 106, 108 coupled to the server 102 via a radio access network 112, 114 or optionally via the IP network 110. Each client 104, 106, 108 has a processor 116 for performing client-related tasks including, but not limited to, protocol stack management such as managing streaming media protocol stacks. The client processors 116 enable generation and processing of RTSP, RTP and RTCP based messages among other functions. For example, the processors 116 included in the mobile phone clients 106, 108 may implement the PSS protocol for establishing streaming media sessions with the content server 102 over a radio access network 112, 114. The clients 104, 106, 108 also have memory 118 for buffering streaming media content received from the server 102 and one or more codecs 120 for decoding the streaming media content.

A streaming media session is established between the client 104, 106, 108 and the content server 102 for streaming media content from the server 102 to the client 104, 106, 108. Part of establishing a streaming media session involves negotiating QoS/QoE metrics to be reported by a client 104, 106, 108 about the session. For example, the client 104, 106, 108 may agree to report initial buffering duration and/or re-buffering duration quality metrics for the session level of the streaming media session. The client 104, 106, 108 may also agree to report successive loss of RTP packets, corruption duration, frame rate deviation, and/or jitter duration quality metrics for each of the media levels associated with the streaming media session, e.g., audio, video, speech and/or timed text levels. The content server 102 or other entity (not shown) processes received QoE/QoS reports to determine the quality of streaming media sessions as measured by the client 104, 106, 108.

Figure 2:
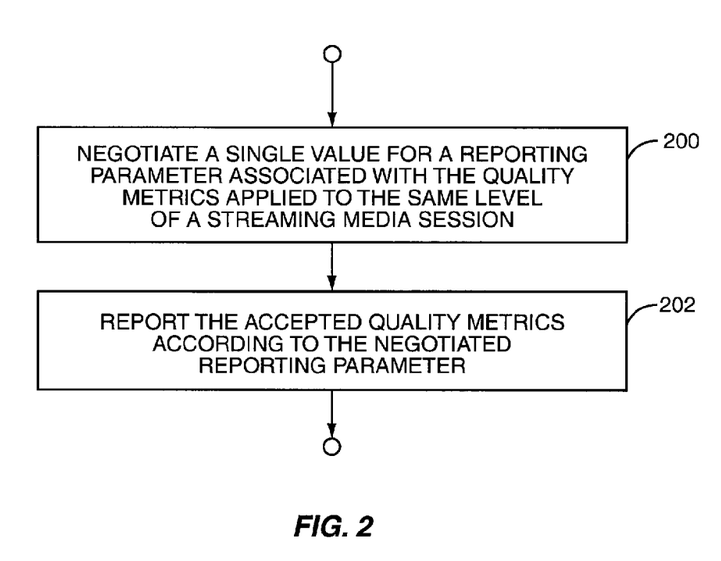
FIG. 2 illustrates an embodiment of processing logic for negotiating a single value for a reporting parameter associated with a plurality of quality metrics applied to the same level of a streaming media session.

During the quality metric negotiation process, a client 104, 106, 108 determines which quality metrics it can support. Each quality metric supported by the client 104, 106, 108 has one reporting parameter (e.g., rate) or more (e.g., rate and range). The reporting parameters determine the frequency by which the client 104, 106, 108 generates QoS/QoE reports and optionally the time range in a particular media stream for which quality metrics are reported. The client 104, 106, 108 negotiates a single value for each reporting parameter associated with all quality metrics applied to the same level of the streaming media session, e.g., as illustrated by Step 200 of FIG. 2. For example, the client 104, 106, 108 may negotiate a single reporting rate and optionally a single reporting range for all supported quality metrics applied to the video level of a streaming media session. This way, each quality metric applied to the same level of a streaming media session is reported with the same rate and optionally the same range, thus reducing the number of QoE/QoS reports generated by the client 104, 106, 108, e.g., as illustrated by Step 202 of FIG. 2. Accordingly, bandwidth consumption is reduced and client performance improved. Of course, as standards advance over time, the client may negotiate a single value for other types of reporting parameters other than rate and range such as a parameter associated with content switching or other aspects of PSS.

Figure 3:
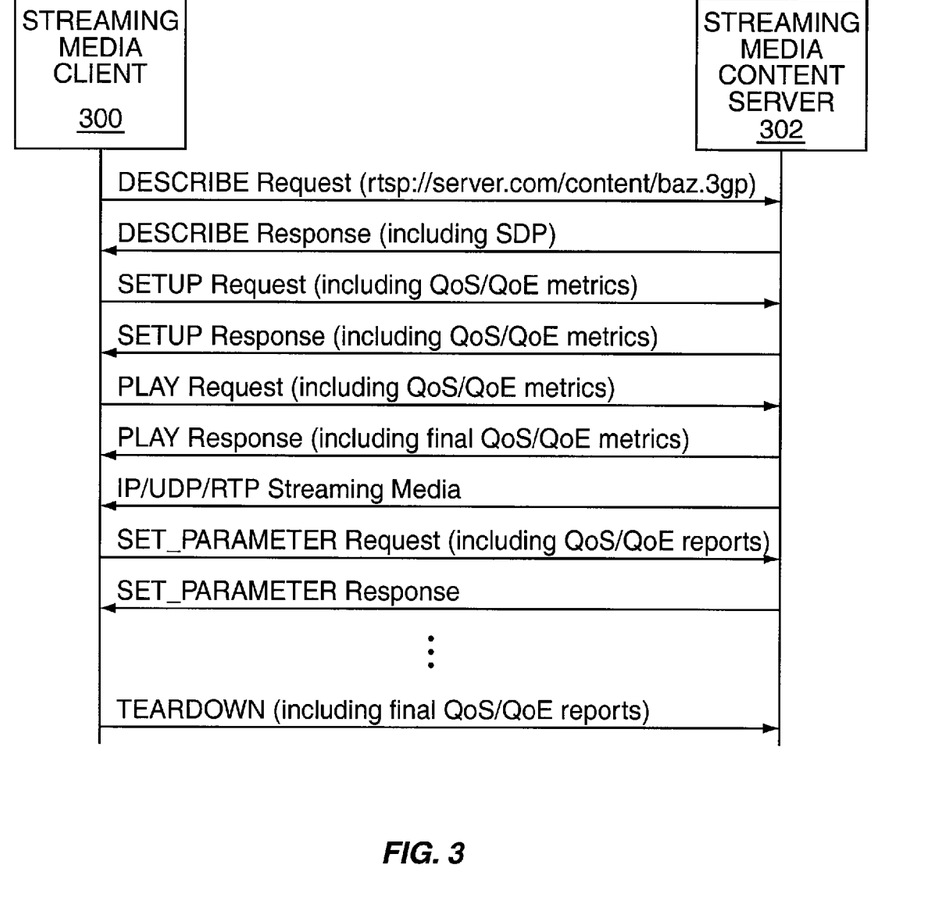
FIG. 3 illustrates an embodiment of sequence of RTSP requests and responses exchanged between a streaming media content server and client.

FIG. 3 illustrates a sequence of exemplary RTSP request and corresponding response messages exchanged between a streaming media client 300 and a content server 302 for establishing and maintaining a streaming media session. In one embodiment, the streaming media session is initiated based on an SDP file downloaded by the client 300 via HTTP, e.g., in a WAP application. This way, the client 300 already has a locally stored SDP file obtained via HTTP. In another embodiment, the streaming media session is initiated when the client 300 transmits an RTSP DESCRIBE request identifying the URI of the desired streaming media content (e.g., rtsp://server.com/content/baz.3gp in FIG. 3). For mobile clients, the DESCRIBE request propagates via a radio access network such as a GSM/EDGE Radio Access Network (GERAN) 112 or a UMTS Terrestrial Radio Access Network (UTRAN) 114 to a core radio network 122. The DESCRIBE request is processed by the core radio network 122, e.g., by a Serving GPRS support node (SGSN) 124 that controls connections between the RANs 112, 114 and mobile clients 106, 108 and a Gateway GPRS Support Node (GGSN) 126 that provides a gateway between the RANs 112, 114 and the IP network 110. After the DESCRIBE request enters the IP network 110, it is routed to the content server 302 identified in the request.

In response to the DESCRIBE request, the content server 302 sends an RTSP DESCRIBE response to the client 300 including a presentation description, e.g., in SDP format. The presentation description declares the media types to be used in the session using a codec-specific MIME media type for each media stream. Part of the presentation description may include a proposed initial set of quality metrics and corresponding reporting parameters. Alternatively, the content server 302 proposes initial quality metrics later, e.g., as part of an RTSP SETUP response. Either way, a sequence of one or more RTSP SETUP request and corresponding response messages are exchanged between the client 300 and server 302 or the client downloads an SDP file via HTTP for finalizing details related to the streaming media session and media content as is well known in the art.

When the client 300 receives a proposed set of quality metrics from the content server 302, the client 300 determines which metrics are supported by the client 300 and which ones are not. The client 300 also determines whether multiple quality metrics are proposed for the same level of the streaming media session. That is, the client 300 determines whether multiple quality metrics are proposed for the session level and media levels (video, audio, speech, and/or timed text) of the streaming media session. Session-level quality metrics are applied to the streaming media session and media-level quality metrics are applied to the indicated media component of the streaming media session. If multiple quality metrics are proposed for the same level, the client 300 proposes a single value for each reporting parameter associated with the proposed quality metrics. This way, the session level of a streaming media session will have only a single reporting rate and a single optional reporting range for all quality metrics accepted by the client 300 and content server 302 for the session level. Likewise, each media level is also assigned a single reporting rate and a single optional reporting range for all accepted quality metrics applied to the media levels.

Figure 4:
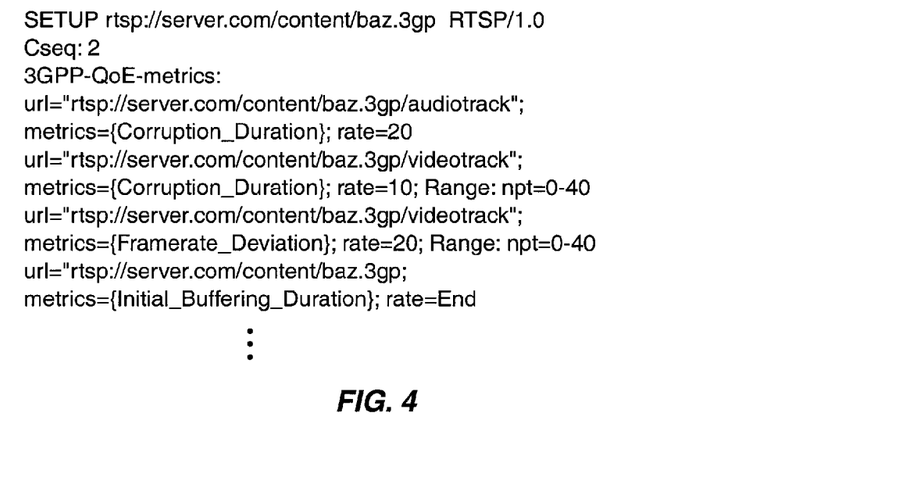
FIG. 4 illustrates an embodiment of an RTSP SETUP response sent by a streaming media content server.

FIG. 4 illustrates an embodiment of an RTSP SETUP response received by the client 300 from the content server 302 including a proposed set of quality metrics. A quality metric negotiation header (3GPP-QoE-Metrics) included in the SETUP response message indicates the proposed quality metrics. In the present example, one quality metric (Initial_Buffering_Duration) and reporting parameter (rate) are applied to the session level (rtsp://server.com/content/baz.3gp) of a streaming media session (rtsp://server.com/content/baz.3gp). One quality metric (Corruption_Duration) and reporting parameter (rate) are also applied to the audio level (rtsp://server.com/content/baz.3gp/audiotrack) of the streaming media session. However, two quality metrics (Corruption_Duration and Framerate_Deviation) and two reporting parameters (rate and range) are applied to the video level (rtsp://server.com/content/baz.3gp/videotrack) of the streaming media session.

Accordingly, the client 300 determines whether it can support the proposed metrics and parameters for the levels identified. If the client 300 supports all proposed quality metrics, the client 300 then negotiates a single value for the reporting rate and range parameters associated with the corruption duration and frame rate deviation quality metrics applied to the video level. In this example, both metrics have the same reporting range (0-40 npt). Preferably, the client 300 accepts the proposed reporting range value for both video-level quality metrics if the client 300 can support the specified range value. However, the client 300 may alternatively propose a different reporting range value for the video-level quality metrics.

Either way, the client 300 proposes a single reporting rate value for the video-level quality metrics since the metrics have different proposed rates (10 seconds for Corruption_Duration and 20 seconds for Framerate_Deviation). Otherwise, the client 300 will generate a QoS/QoE report twice as often for the corruption duration quality metric if the client 300 accepted the different parameter values proposed by the content server 302 for the video level, thus consuming additional bandwidth and reducing client performance. In one embodiment, the client 300 selects the first reporting rate identified in the SETUP response (10 seconds). In another embodiment, the client 300 selects the reporting rate having the least impact on bandwidth consumption (20 seconds in FIG. 4). In yet another embodiment, the client 300 selects a single reporting rate independently of the reporting rates proposed by the content server 302. In still another embodiment, the client 300 uses a reporting rate identified earlier in the negotiation phase, such as one included in a downloaded SDP file, or a reporting rate that was already acknowledged accepted by the server 302 for other metrics at the same level.

Figure 5:
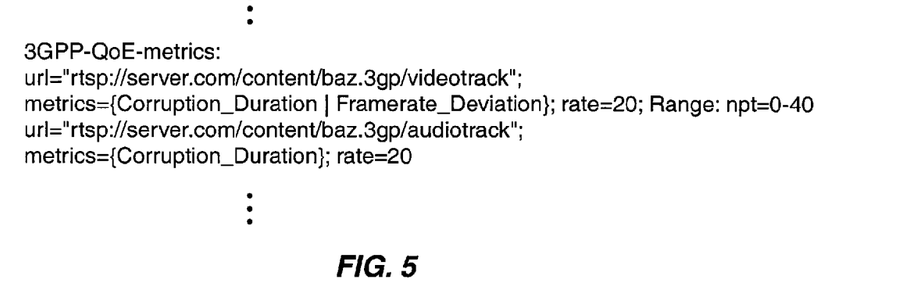
FIG. 5 illustrates an embodiment of an RTSP request sent by a streaming media client for negotiating a single reporting rate for multiple quality metrics applied to the same level of a streaming media session.

Regardless, the client 300 sends either another SETUP request or a PLAY request to the content server 302 or uses the SET_PARAMETER or OPTIONS method to identify the newly proposed single reporting rate (e.g., 20 seconds) for both video-level quality metrics as shown in FIG. 5. The response also indicates the client 300 accepted the single reporting range of 0-40 npt for the video-level quality metrics. Alternatively, the client 300 may propose a different reporting range for the video-level quality metrics as previously described. The reporting rate for the audio-level quality metric is also identified in the response to indicate acceptance by the client 300.

The content server 302 either acknowledges acceptance of one or more of the proposed quality metrics and corresponding reporting parameter values or proposes different ones. The content server 302 accepts a particular quality metric and reporting parameter value, e.g., via the SET_PARAMETER or OPTIONS method or by sending a response to the client 300 such as a SETUP or PLAY response indicating acknowledgement. If a response is sent, the response includes the quality metric and reporting parameter value provided by the client 300 in the previous request for which the server 302 is acknowledging acceptance. Quality metrics acknowledged accepted by the server 302 are not included in subsequent requests sent by the client 300 since they have been agreed upon by both the client 300 and content server 302.

The content server 302 may propose a different parameter value by identifying the different value and the corresponding metric in the response. The client 300 may accept the different value or propose a new value in a subsequent request. Either way, quality metric negotiation continues until all metrics are acknowledged accepted by the content server 302 or when the server 302 sends a PLAY response to the client 300. A PLAY response indicates quality metric negotiation is complete and delivery of streaming media content is to begin. Alternatively, quality metric negotiation may terminate when a particular number of round trip negotiations between the client 300 and server 302 is reached. Regardless, only quality metrics acknowledged accepted by the content server 302 and client 300 are reported by the client 300 based on the agreed upon reporting parameter(s). Since the client 300 negotiates a single reporting rate and a single optional reporting range for all accepted quality metrics applied to the same level of a streaming media session, the number of QoS/QoE reports the client 300 sends is significantly reduced, thereby reducing bandwidth consumption and improving client performance.

Figure 6:
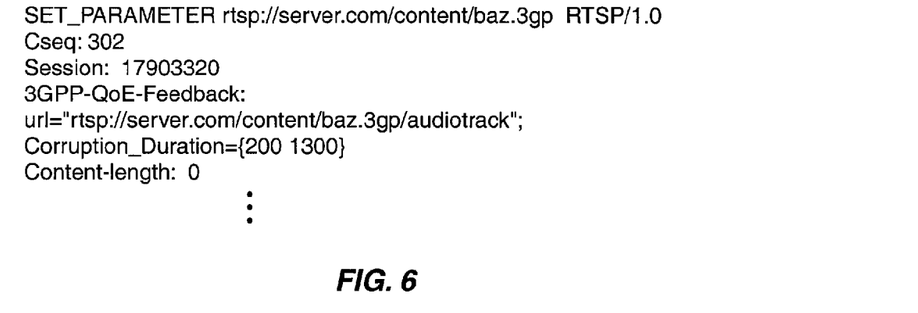
FIG. 6 illustrates an embodiment of a QoS/QoE report sent by a streaming media client.

After quality metric negotiation ends, the client 300 sends QoS/QoE reports indicating quality of the received streaming media content. The rate at which QoS/QoE reports are sent for each level of the streaming media session depend on the single reporting rate value negotiated by the client 300 for each level. The client 300 may send a QoS/QoE report as part of an RTSP SET_PARAMETER, PAUSE or TEARDOWN messages. For mobile clients 106,108, QoS/QoE reports are sent to the content server 302 over the radio access network 112, 114. FIG. 6 illustrates an exemplary SET_PARAMETER message including a QoS/QoE report. The message includes two measurements obtained by the client 300 (200 and 1300) for the corruption duration metric (Corruption_Duration) reported for the audio level of a streaming media session. The streaming media session referenced in this example was established based on the SETUP request message illustrated in FIG. 4. A quality metric feedback header (3GPP-QoE-Feedback) included in the SET_PARAMETER message indicates quality metric data is included in the message. According to FIG. 6, the corruption duration quality metric for the audio-level of the streaming media session is reported. Broadly, the client 300 generates a single QoS/QoE report for each level of a streaming media session based on the single reporting rate negotiated for each level. This way, the client does not generate multiple reports at different rates for the same level of the streaming media session.

Figure 7:
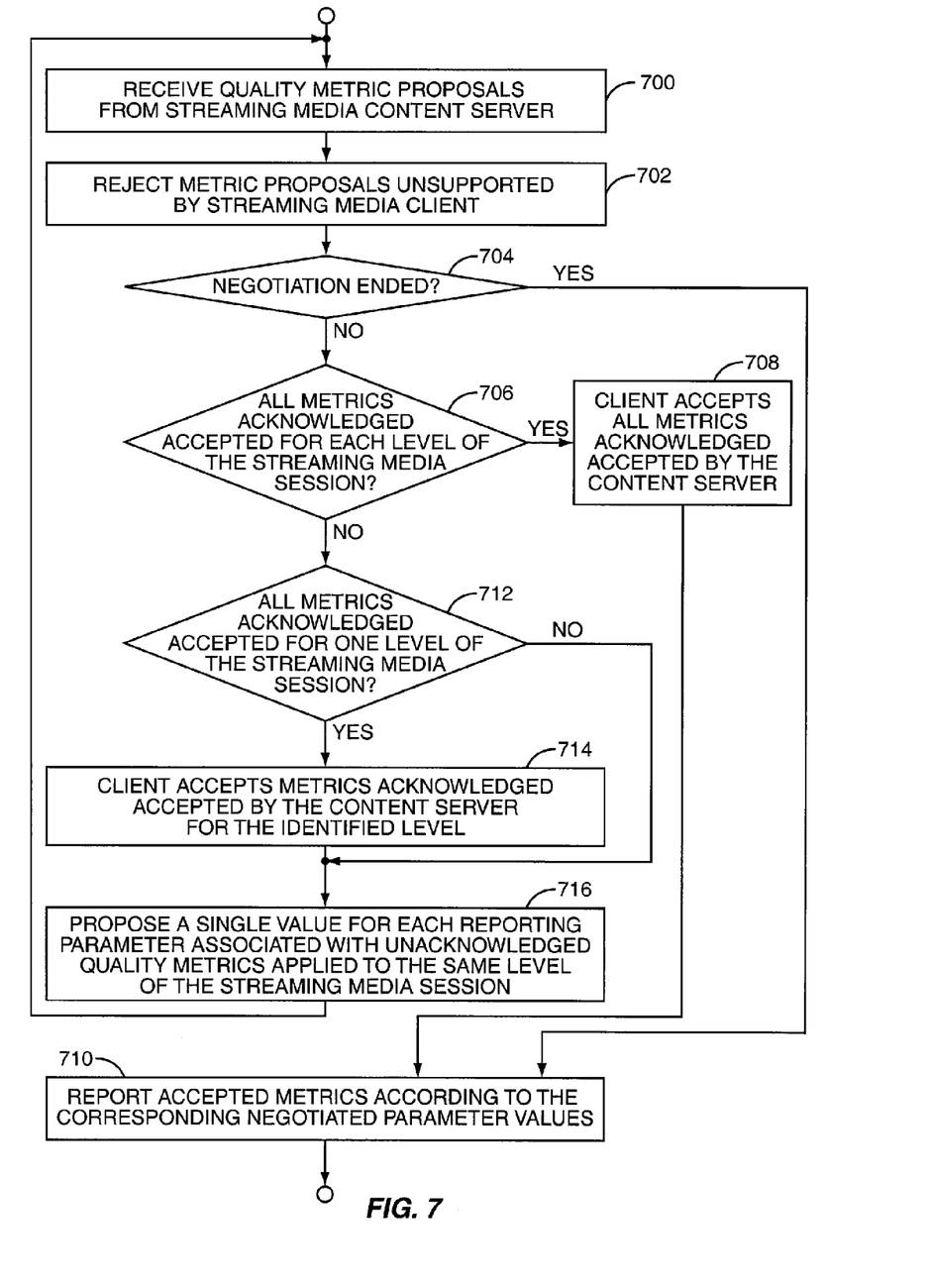
FIG. 7 illustrates another embodiment of processing logic for negotiating a single value for a reporting parameter associated with a plurality of quality metrics applied to the same level of a streaming media session.

FIG. 7 illustrates an embodiment of exemplary processing logic for negotiating a single value for each reporting parameter associated with all accepted quality metrics applied to the same level of a streaming media session. The processing logic begins with a client 104, 106, 108 receiving quality metric proposals from the content server 102, e.g., as part of an RTSP DESCRIBE or SETUP response message or an SDP file (Step 700). The quality metrics may be an initial set of quality metric proposals received from the content server 102, e.g., included in an RTSP DESCRIBE response or SETUP response or an SDP file sent by the server 102. Alternatively, the quality metrics may be a re-negotiated set of metric proposals received from the content server 102 later on during the quality metric negotiation process, e.g., as part of an RTSP SETUP or PLAY response received from the server 102 or via the SET_PARAMETER or OPTIONS method. Either way, the client 104, 106, 108 rejects unsupported quality metrics and parameters (Step 702). The client 104, 106, 108 attempts to negotiate a single reporting rate and optionally a single reporting range for all supported quality metrics which are applied to the same level of the streaming media session unless quality metric negotiation has ended (Step 704). In one embodiment, the client 300 includes in requests sent to the server 302 only the metrics yet to be accepted by both the client 300 and server 302.

The client 104, 106, 108 determines whether all supported quality metrics have been acknowledged accepted by the content server 102 for each level of the streaming media session (Step 706). The client 104, 106, 108 negotiates a single reporting rate and optionally a single reporting range for all supported quality metrics applied to the same level of the streaming media session. This way, if the content server 102 acknowledges acceptance of all quality metric proposals made by the client 104, 106, 108, the client 104, 106, 108 then accepts all of the metrics (Step 708). The client 104, 106, 108 subsequently reports the accepted quality metrics based on the agreed upon reporting rate and optional reporting range for each level of the streaming media session (710).

However, if the content server 102 does not acknowledge acceptance of all supported quality metrics, the client 104, 106, 108 determines whether the quality metrics applied to a particular level of the streaming media session have been acknowledged accepted by the server 102 (Step 712). The client 104, 106, 108 accepts all quality metrics acknowledged accepted for a particular level of the streaming media session since the metrics have at least the same reporting rate (Step 714). The client 104, 106, 108 then proposes the same single reporting rate and the same single optional reporting range for the quality metrics that have not been acknowledged accepted by the content server 102. In one embodiment, the content server 102 acknowledges acceptance of a previously proposed reporting rate for a first subset of quality metrics applied to a particular level of the streaming media session, but proposes a different reporting rate for the other quality metrics.

For example, the client 104, 106, 108 may propose a 20 second reporting rate for the corruption duration, jitter duration and frame rate deviation metrics applied to the video level of a streaming media session. The content server 102 acknowledges acceptance of the 20 second reporting rate for the corruption duration and jitter duration metrics, but proposes a 10 second reporting rate for the frame rate deviation metric. According to this embodiment, the client 104, 106, 108 accepts the 20 second reporting rate for the corruption duration and jitter duration metrics, but rejects the 10 second reporting rate for the frame rate deviation metric because it is different from the rate previously proposed by the client 104, 106, 108. Accordingly, the client 104, 106, 108 proposes a single reporting rate for all of the quality metrics applied to the video level of the streaming media session, e.g., as part of an RTSP SETUP OR PLAY request or via the SET_PARAMETER or OPTIONS method (Step 716). Preferably, the client 104, 106, 108 proposes a 20 second reporting rate in this example because the 20 second rate was previously acknowledged accepted by the content server 102 for the corruption duration and jitter duration metrics. This way, the client 104, 106, 108 need only propose a 20 second reporting rate for the frame rate deviation metric.

In another embodiment, the content server 102 proposes a different reporting rate for all supported quality metrics applied to a particular level of the streaming media session. For example, the client 104, 106, 108 may propose a 20 second reporting rate for the corruption duration, jitter duration and frame rate deviation metrics applied to the video level of a streaming media session. The content server 102 counter proposes a 10 second reporting rate for each of the quality metrics applied to the video level. According to this embodiment, the client 104, 106, 108 accepts the 10 second reporting rate for the corruption duration, jitter duration and frame rate deviation metrics because the content server 102 proposed a single reporting rate, albeit different from the original rate proposed by the client 104, 106, 108. Accordingly, the client 104, 106, 108 proposes a 10 second reporting rate for all of the quality metrics applied to the video level of the streaming media session, e.g., as part of an RTSP SETUP OR PLAY request or via the SET_PARAMETER or OPTIONS method (Step 716).

According to either embodiment, the client 104, 106, 108 negotiates a single reporting rate and optionally a single reporting range (or other reporting parameter) for all supported quality metrics applied to the same level of a streaming media session. Quality metric proposals received from the content server 102 may not be properly organized by level. That is, the content server 102 may associate both session level and media level quality metrics with one level of the streaming media session, e.g., the session level. When this occurs, the client 104, 106, 108 may reapply the quality metrics to the appropriate level of the streaming media session. For example, the content server 102 may apply both session level quality metrics (e.g., initial buffering duration and/or re-buffering duration) and media level quality metrics (e.g., successive loss of RTP packets, corruption duration, frame rate deviation, and/or jitter duration) to the session level of a streaming media session. Accordingly, the client 104, 106, 108 re-applies the media-level metrics to the appropriate media levels. In one embodiment, the client 104, 106, 108 re-applies the media-level metrics to an appropriate media level by associating the media-level quality metrics with corresponding URIs identifying the appropriate media components of the streaming media session, e.g., as part of an RTSP SETUP or PLAY request or via the SET_PARAMETER or OPTIONS method. The client 104, 106, 108 then negotiates a single value for each reporting parameter associated with the quality metrics applied to the session level and each media level.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of indicating quality of a streaming media session established between a client and a server, the streaming media session having a session level and at least one media level, the method comprising:
   requiring the client to negotiate the same value for each reporting parameter associated with a plurality of quality metrics applied to the same level of the streaming media session;
   requiring the client to reject each quality metric applied to the same level of the streaming media session for which the same reporting value cannot be agreed to by the client and the server; and
   requiring the client to group the quality metrics accepted by the client and server during negotiation for the same level of the streaming media session in the same report and send the report according to the negotiated reporting parameter value.

2. The method of claim 1, comprising requiring the client to negotiate the same reporting rate for each reporting parameter associated with the plurality of quality metrics applied to the same level of the streaming media session.

3. The method of claim 2, comprising requiring the client to negotiate the same reporting range for each reporting parameter associated with the plurality of quality metrics applied to the same level of the streaming media session.

4. The method of claim 1, comprising:
   requiring the client to select the same reporting parameter value from a plurality of reporting parameter values included in a response received from the server; and
   sending a request to the server proposing the selected reporting parameter value for each of the quality metrics supported by the client.

5. The method of claim 4, further comprising:
   processing a subsequent response received from the server proposing a new value for the reporting parameter associated with each of the quality metrics supported by the client; and requiring the client to replace the previously proposed reporting parameter value with the newly proposed reporting parameter value for each of the quality metrics supported by the client.

6. The method of claim 5, further comprising sending a subsequent request to the server indicating the client accepted the newly proposed reporting parameter value for each of the quality metrics supported by the client.

7. The method of claim 4, further comprising:
processing a subsequent response received from the server acknowledging acceptance of the previously proposed reporting parameter value for a first subset of the quality metrics supported by the client and proposing a new reporting parameter value for a second subset of the quality metrics supported by the client;
accepting the previously proposed reporting parameter value for the first subset of the quality metrics supported by the client; and
rejecting the newly proposed reporting parameter value for the second subset of the quality metrics supported by the client.

8. The method of claim 7, further comprising sending a subsequent request to the server re-proposing the previously selected reporting parameter value for the second subset of the quality metrics supported by the client.

9. The method of claim 1, comprising:
requiring the client to negotiate the same value for each reporting parameter associated with a plurality of session quality metrics applied to the session level of the streaming media session; and
requiring the client to negotiate the same value for each reporting parameter associated with a plurality of media quality metrics applied to at least one of a video, audio, speech or timed text media level of the streaming media session.

10. The method of claim 1, comprising:
receiving a response from the server applying session quality metrics and media quality metrics to the session level of the streaming media session;
re-applying the media quality metrics to one of the media levels of the streaming media session;
requiring the client to negotiate the same value for each reporting parameter associated with the session quality metrics applied to the session level; and
requiring the client to negotiate the same value for each reporting parameter associated with the media quality metrics applied to one of the media levels.

11. The method of claim 10, wherein re-applying the media quality metrics to one of the media levels of the streaming media session comprises associating the media quality metrics with a uniform resource identifier identifying a media component of the streaming media session.

12. The method of claim 1, wherein reporting the quality metrics comprises sending a report including measurements obtained by the client based on the quality metrics to the server over a packet-switched radio access network.

13. A streaming media client for indicating quality of a streaming media session established between the client and a server, the streaming media session having a session level and at least one media level, the client comprising a processor configured to:
require the client to negotiate the same value for each reporting parameter associated with a plurality of quality metrics applied to the same level of the streaming media session;
require the client to reject each quality metric applied to the same level of the streaming media session for which the same reporting value cannot be agreed to by the client and the server; and
require the client to group the quality metrics accepted by the client and server during negotiation for the same level of the streaming media session in the same report and send the report according to the negotiated reporting parameter value.

14. The streaming media client of claim 13, wherein the processor is configured to require the client to negotiate the same reporting rate for each reporting parameter associated with the plurality of quality metrics applied to the same level of the streaming media session.

15. The streaming media client of claim 14, wherein the processor is further configured to require the client to negotiate the same reporting range for each reporting parameter associated with the plurality of quality metrics applied to the same level of the streaming media session.

16. The streaming media client of claim 13, wherein the processor is configured to:
requiring the client to select the same reporting parameter value from a plurality of reporting parameter values included in a response received from the server; and
generate a request targeted to the server proposing the selected reporting parameter value for each of the quality metrics supported by the client.

17. The streaming media client of claim 16, wherein the processor is further configured to:
process a subsequent response received from the server proposing a new value for the reporting parameter value associated with each of the quality metrics supported by the client; and
replace the previously proposed reporting parameter value with the newly proposed reporting parameter value for each of the quality metrics supported by the client.

18. The streaming media client of claim 17, wherein the processor is further configured to generate a subsequent request targeted to the server indicating the client accepted the newly proposed reporting parameter value for each of the quality metrics supported by the client.

19. The streaming media client of claim 16, wherein the processor is further configured to:
process a subsequent response received from the server acknowledging acceptance of the previously proposed reporting parameter value for a first subset of the quality metrics supported by the client and proposing a new reporting parameter value for a second subset of the quality metrics supported by the client;
require the client to accept the previously proposed reporting parameter value for the first subset of the quality metrics supported by the client; and
require the client to reject the newly proposed reporting parameter value for the second subset of the quality metrics supported by the client.

20. The streaming media client of claim 19, wherein the processor is further configured to generate a subsequent request targeted to the server re-proposing the previously selected reporting parameter value for the second subset of the quality metrics supported by the client.

21. The streaming media client of claim 13, wherein the processor is configured to:
require the client to negotiate the same value for each reporting parameter associated with a plurality of session quality metrics applied to the session level of the streaming media session; and require the client to negotiate the same value for each reporting parameter associated with a plurality of media quality metrics applied to at least one of a video, audio, speech or timed text media level of the streaming media session.

22. The streaming media client of claim 13, wherein the processor is configured to:
   process a response received from the server applying session quality metrics and media quality metrics to the session level of the streaming media session;
   re-apply the media quality metrics to one of the media levels of the streaming media session;
   require the client to negotiate the same value for each reporting parameter associated with the session quality metrics applied to the session level; and
   require the client to negotiate the same value for each reporting parameter associated with the media quality metrics applied to one of the media levels.

23. The streaming media client of claim 22, wherein the processor is configured to associate the media quality metrics with a uniform resource identifier identifying a media component of the streaming media session.

24. The streaming media client of claim 13, wherein the processor is configured to generate a report including measurements obtained by the client based on the quality metrics for transfer to the server over a packet-switched radio access network.

\* \* \* \* \*